(12) United States Patent
Javan Roshtkhari et al.

(10) Patent No.: US 12,124,952 B2
(45) Date of Patent: Oct. 22, 2024

(54) SYSTEM AND METHOD FOR IDENTITY PRESERVATIVE REPRESENTATION OF PERSONS AND OBJECTS USING SPATIAL AND APPEARANCE ATTRIBUTES

(71) Applicant: Sportlogiq Inc., Montreal (CA)

(72) Inventors: Mehrsan Javan Roshtkhari, Beaconsfield (CA); Md Amran Hossen Bhuiyan, Montreal (CA); Yang Liu, Ottawa (CA); Parthipan Siva, Waterloo (CA); Eric Georges Granger, Montreal (CA); Ismail Ben Ayed, Sainte-Marthe-sur-le-Lac (CA)

(73) Assignee: Sportlogiq Inc., Montrea (CA)

( * ) Notice: Subject to any disclaimer, the term of this patent is extended or adjusted under 35 U.S.C. 154(b) by 0 days.

(21) Appl. No.: 17/809,175

(22) Filed: Jun. 27, 2022

(65) Prior Publication Data

US 2022/0383662 A1 Dec. 1, 2022

Related U.S. Application Data

(63) Continuation of application No. PCT/CA2021/050020, filed on Jan. 11, 2021.
(Continued)

(51) Int. Cl.
*G06N 3/08* (2023.01)
*G06V 10/44* (2022.01)
(Continued)

(52) U.S. Cl.
CPC ............... *G06N 3/08* (2013.01); *G06V 10/44* (2022.01); *G06V 10/761* (2022.01);
(Continued)

(58) Field of Classification Search
CPC .......... G06N 3/08; G06N 3/045; G06V 10/44; G06V 10/761; G06V 10/7715;
(Continued)

(56) References Cited

U.S. PATENT DOCUMENTS

| | | | | |
|---|---|---|---|---|
| 6,219,633 B1 * | 4/2001 | Lepage | ................. | G06F 40/247 704/9 |
| 9,396,412 B2 * | 7/2016 | Kuo | ...................... | G06F 18/214 |

(Continued)

FOREIGN PATENT DOCUMENTS

| | | |
|---|---|---|
| CN | 108197631 A | 6/2018 |
| WO | 2017046872 A1 | 3/2017 |

OTHER PUBLICATIONS

Wenqi Ren, Lin Ma, "Gated Fusion Network for Single Image Dehazing" (Year: 2018).*

(Continued)

*Primary Examiner* — Dhaval V Patel
(74) *Attorney, Agent, or Firm* — CPST Intellectual Property Inc.; Filip Boskovic; Brett J. Slaney

(57) ABSTRACT

A method is described, for processing images of persons or objects to generate an identity preservative feature descriptor learnt for each person or object. The method includes obtaining an image of a person or object, extracting at least one spatial attribute of the person or object from the obtained image, and extracting at least one appearance feature of the person or object from the image by using a mapping function to translate image pixels into appearance attributes represented by at least one numerical feature. The method also includes combining the at least one spatial attribute and the at least one appearance feature to generate the unique feature descriptor representing the person or the object, to assign the unique feature descriptor to the image to enable feature descriptors representing the same person or object to be compared to feature descriptors representing different
(Continued)

people or objects given a predefined mathematical pseudo-distance metric according to a least a distance from each other.

25 Claims, 10 Drawing Sheets

Related U.S. Application Data

(60) Provisional application No. 62/959,561, filed on Jan. 10, 2020.

(51) Int. Cl.
| | |
|---|---|
| *G06V 10/74* | (2022.01) |
| *G06V 10/77* | (2022.01) |
| *G06V 10/80* | (2022.01) |
| *G06V 10/82* | (2022.01) |
| *G06V 20/40* | (2022.01) |
| *G06V 20/52* | (2022.01) |
| *G06V 40/10* | (2022.01) |
| *G06V 40/20* | (2022.01) |

(52) U.S. Cl.
CPC ........ *G06V 10/7715* (2022.01); *G06V 10/806* (2022.01); *G06V 10/82* (2022.01); *G06V 20/46* (2022.01); *G06V 20/52* (2022.01); *G06V 40/10* (2022.01); *G06V 40/23* (2022.01); *G06V 2201/07* (2022.01)

(58) Field of Classification Search
CPC ...... G06V 10/806; G06V 10/82; G06V 20/46; G06V 20/52; G06V 40/10; G06V 40/23; G06V 2201/07; G06F 18/214
See application file for complete search history.

(56) References Cited

U.S. PATENT DOCUMENTS

| | | | | |
|---|---|---|---|---|
| 9,633,263 | B2 * | 4/2017 | Brown | G06V 10/758 |
| 2016/0379055 | A1 * | 12/2016 | Loui | G06F 18/2323 |
| | | | | 382/103 |
| 2016/0379085 | A1 * | 12/2016 | Dodballapur | G06V 10/751 |
| | | | | 382/218 |
| 2019/0108613 | A1 * | 4/2019 | Hotson | G06T 5/50 |
| 2020/0357143 | A1 * | 11/2020 | Chiu | G06F 18/253 |

OTHER PUBLICATIONS

Extended European Search Report issued in related EP Application No. 21738180.5; dadted Oct. 23, 2023.
Pala Federico et al: "Multimodal Person Reidentification Using RGB-D Cameras"; IEEE Transactions on Circuits and Systems For Video Technology, IEEE, U.S.A., vol. 26, No. 4, Apr. 1, 2016; pp. 788-799.
Ren Qiang-Qiang et al: "Person Re-identification Based on Feature Fusion", Jul. 24, 2019;; Advances in Databases and Information Systems; Lect.Notes Computer), Springer International Publishing Cham, pp. 65-73.
Hu Xiao et al.; "Region-Partition Based Bilinear Fusion Network for Person Re-Idenfitication", 2018 IEEE Global Conference on Signal and Information Processing (GLOBALSIP), IEEE, Nov. 26, 2018, pp. 415-419.
Blott, Gerogor et al.; "View-Aware Person Re-identification", Feb. 14, 2019, Advances in Databses and Information Systems; (Lecture Notes in Computer Science; Lect.Notes Computer), Springer International Publishing, Cham, pp. 46-59.
Lejbolle, Aske R. et al., "Attention in Multimodial Nueral Networks for Person Re-identification", 2018 IEEE/CVF Conference on Computer Vision and Pattern Recognition Workshops (CVPRW), IEEE, Jun. 18, 2018, pp. 292-2928.
International Search Report issued in corresponding PCT Application No. PCT/CA2021/050020; Mar. 22, 22 2021.
Farenzena, M., Bazzani, L.; Perina, A.; Murino, V.; and Cristani, M.; Person re-identification by symmetry-driven accumulation of local features. In CVPR, 2010. pp. 2360-2367.
Cheng, D.; Gong, Y.; Zhou, S.; Wang, J. and Zheng, N.; Person re-identification by multi-channel parts-based CNN with improved triplet loss function. In CVPR, 2016. pp. 1335-1344.
Liu, H., Feng, J.; Qi, M.; Jiang, J. and Yan, S.; End-to-end comparative attention networks for person re-identification. IEEE Transactions on Image Processing, vol. 26, No. 7, pp. 3492-3506, Jul. 2017.
Varior, R. R., Haloi, M., and Wang, G.; Gated Siamese convolutional neural network architecture for human re-identification. In ECCV, 2016. vol. 9912; pp. 791-808.
Koestinger, M.; Hirzer, M.; Wohlhart, P.; Roth, P. M. and Bischof, H; Large scale metric learning from equivalence constraints. In CVPR, 2012; pp. 2288-2295.
Mirmahboub, B.; Kiani, H.; Bhuiyan, A.; Perina, A.; Zhang, B.; Del Bue, A. and Murino, V.; Person re-identification using sparse representation with manifold constraints. In ICIP, 2016; pp. 774-778.
Hermans, A., Beyer, L., and Leibe, B.; In defense of the triplet loss for person re-identification. arXiv preprint arXiv:1703.07737, 2017.
Chen, W.; Chen, X.; Zhang, J. and Huang, K.; Beyond triplet loss: a deep quadruplet network for person re-identification. In CVPR, 2017; pp. 403-412.
He, K.; Zhang, X.; Ren; S. and Sun, J.; Deep residual learning for image recognition. iIn 2016 IEEE Conference on Computer Vision and Pattern Recognition (CVPR), Las Vegas, NV, USA, 2016 pp. 770-778.
Szegedy, C.; Ioffe, S.; Vanhoucke, V.; and Alemi, A. A.; Inception-v4, inception-resnet and the impact of residual connections on learning. AAAI'17: Proceedings of the Thirty-First AAAI Conference on Artificial IntelligenceFebruary 2017 pp. 4278-4284.
Huang, G.; Liu, Z; Van Der Maaten and Weinberger, K. Q.; Densely connected convolutional networks. In CVPR, 2017; pp. 4700-4708.
Cao, Z.; Simon, T.; Wei, S.-E. and Sheikh, Y.; Realtime multi-person 2D pose estimation using part affinity fields. In CVPR, 2017, pp. 7291-7299.
Hu, J.; Shen, L. and Sun, G.; Squeeze-and-excitation networks. In CVPR, 2018, pp. 7132-7141.
Li, W.; Zhao, R.; Xiao, T. and Wang, X.; Deepreid: Deep filter pairing neural network for person re-identification. In CVPR, 2014, pp. 152-159.
Zheng, L.; Shen, L.; Tian, L.; Wang, S.; Want, J. and Tian, Q.; Scalable person re-identification: A benchmark. In ICCV, 2015; pp. 1116-1124.
Zheng, Z.; Zheng, L. and Yang, Y.; Unlabeled samples generated by GAN improve the person re-identification baseline in vitro. In ICCV, 2017, pp. 3774-3782.
Zhong, Z.; Zheng, L.; Cao, D. and Li, S.; Re-ranking person re-identification with k-reciprocal encoding. In CVPR, 2017; pp. 3652-3661.
Russakovsky, O.; Deng, J.; Su, H.; Krause, J.; Satheesh, S.; Ma, S.; Huang, Z.; Karpathy, A.; Khosla, A.; Bernstein, M., et al. Imagenet large scale visual recognition challenge. International journal of computer vision, 115(3):211-252, 2015.
Lin, T.Y.; Marie, M.; Belongie, S.; Hays, J.; Perona, P.; Ramanan, D.; Dollar, P. and Zitnick, C. L.; Microsoft COCO: Common objects in context. In ECCV, 2014.
Wang, Y.; Wang, L.; You, Y.; Zou, X.; Chen, V.; Li, S.; Li, G.; Huang, B.; Hariharan, and Weinberger, K. Q.; Resource aware person re-identification across multiple resolutions. In CVPR, 2018; pp. 8042-8051.
Ristani, E. and Tomasi, C.; Features for multi-target multi-camera tracking and re-identification. In CVPR, 2018; pp. 6036-6046.

\* cited by examiner

SYSTEM AND METHOD FOR IDENTITY PRESERVATIVE REPRESENTATION OF PERSONS AND OBJECTS USING SPATIAL AND APPEARANCE ATTRIBUTES

CROSS-REFERENCE TO RELATED APPLICATION(S)

This application is a Continuation of PCT Application No. PCT/CA2021/050020 filed on Jan. 11, 2021, and claims priority to U.S. Provisional Patent Application No. 62/959,561 filed on Jan. 10, 2020, the contents of both being incorporated herein by reference.

TECHNICAL FIELD

The following generally relates to video and image processing, including systems and methods for identity preservative representation of persons and objects using spatial and appearance attributes, for example in reidentification and object tracking.

BACKGROUND

Identity preservative representation of persons and other objects is considered an important part of any vision-based tracking system, where the objects and persons are tracked and identified. One of the immediate applications of the identity preservative representations is for object and person reidentification which is an important function required in many computer vision applications such as video surveillance, search and retrieval, pedestrian tracking for autonomous driving, and multi-camera multi-target tracking. Reidentification refers to identifying that an observed image of an object such as a car or a human, captured by an imaging device, is the same as the as an image obtained from the same object, captured either by the same imaging device or a different one, at the same or another time. In other words, given a query image of an individual, reidentification can be seen as a problem of ranking the similarity of all the previously observed images in the gallery. Generally, the aim of reidentification is to recognize individuals tracked over a set of distributed non-overlapping cameras with different viewpoints and camera poses and the variability of image capture conditions (e.g., illumination, scale, motion blur, human body deformation and pose changes) under a weak assumption that an individual's overall appearance may remain somewhat preserved in all of the different observations [1, 2].

State-of-the art approaches for person reidentification typically learn global appearance features directly from the images through various metric learning losses [3, 4, 5], such as Siamese or triplet-loss neural networks which are used to learn an embedding space, where similar image pairs of the same person/object are close to each other, and dissimilar image pairs (different person/objects) are distant from each other [5]. Although these approaches have achieved a high-level of accuracy, they suffer from misalignment which can be attributed to pose/viewpoint variation and person detection error, which are very common in the surveillance videos. A typical scenario of misalignment is depicted in FIG. 6.

Feature aggregation approaches are commonly proposed to address the misalignment issue. These approaches include weighing or maximum pooling as well as some advance techniques such as bilinear pooling or a gated recurrent unit (GRU). In particular, gating mechanisms allow for multiplicative interaction between input features and context gate features. During inference, this mechanism allows one to dynamically increase the contextual information. Gating functions introduce an attention mechanism which can eventually help dynamically address misalignment issues by focusing on parts, rather than the whole image.

Classical approaches for reidentification can be regrouped into two major categories. One family of methods focuses on searching for the most discriminative features and their combination so to design a powerful descriptor (or signature) for each individual regardless of the scene [2] while the second family of the methods tries to learn a discriminate distance metric learnt from the data in order to close the gap between a person's different features [6, 7]. Like other computer vision systems that rely on the hand-crafted features, the former methods are found to suffer from poor generalization, while the latter are found to suffer from computational complexity when the number of cameras or individuals in the scene increases over time.

In prior attempts, it is found that most of the reidentification techniques are based on a holistic approach, thereby learning a global feature representation of the observation without explicitly considering the spatial structure of the person. Following that direction, various learning based re-identification approaches have been introduced [8, 5, 9] to learn representative features through various metric learning losses such as contrastive loss [5], triplet loss [4], improved triplet loss [3], quadruplet loss [9], and triplet hard loss [8]. Due to non-rigid structure of the human body, appearance models that consider individual parts or the pose of the body should be considered [2].

It is an object of the following to address at least one of the above-noted disadvantages.

SUMMARY

The following discloses a method for person and object representation for identity preservation, to be used for tracking and/or reidentification in images and videos which is able to co-jointly learn feature embedding that incorporates relevant spatial information from human body appearances with pose/viewpoint information. In other words, it learns to represent an object or person by paying attention to the spatial and appearance attributes of the person and the object, so that representation of the person or object remain consistent for different observations of the same person or object. This can be achieved by combining the skeletal information or spatial attributes and appearance attributes of the objects or persons. Given an input image of a person or object, in one aspect the gated fusion mechanism (or the learnt selective feature aggregation process) can rely on an object's skeletal information and its features as an attention mechanism to dynamically select the most discriminant information from the appearance features. In another aspect, the skeletal information by itself can be used as auxiliary features in addition to the appearance features for re-identification.

The disclosed spatial-structured-aligned identity preservative representation method (with dynamic spatial-structure guided appearance feature learning and selection with a gating mechanism) for tracking and reidentification addresses the misalignment issue for reidentification, while providing a flexible framework to combine spatial and appearance information at either lower- or higher-level visual features.

During the learning phase of the disclosed method, the mechanisms inside the gating fusion can increase the spatial contextual information that is to the amplified local similarities, encouraging the lower and middle level filters to learn to extract more locally similar patterns, where the lower level filters represent low-level visual features, and whereas mid-level filters extract more abstract concepts (attributes) such as the parts, or more complicated texture patterns from the visual input.

Although certain aspects of the disclosed methods are related to the person reidentification, the systems and methods described herein can be used for object reidentification as long as the objects have some representative spatial structural features. For example, in the case of humans, the spatial structural features can be represented by the body pose or the body skeleton.

Although certain aspects of the disclosed methods are related to the person reidentification, the identity preservative representation of the objects from images can be used for object tracking in videos, in which the observations that belong to the same object or person across different images in a video are connected to each other using standard data association techniques to form a trajectory over time.

In one aspect, there is provided a method for processing images of persons or objects to generate an identity preservative feature descriptor learnt for each person or object, the method comprising: obtaining an image of a person or object; extracting at least one spatial attribute of the person or object from the obtained image; extracting at least one appearance feature of the person or object from the image by using a mapping function to translate image pixels into appearance attributes represented by at least one numerical feature; and combining the at least one spatial attribute and the at least one appearance feature to generate the unique feature descriptor representing the person or the object, to assign the unique feature descriptor to the image to enable feature descriptors representing the same person or object to be compared to feature descriptors representing different people or objects given a predefined mathematical pseudo-distance metric according to a least a distance from each other.

In another aspect, there is provided a computer readable medium comprising computer executable instructions for processing images of persons or objects to generate an identity preservative feature descriptor learnt for each person or object, comprising instructions for performing the method above.

In yet another aspect, there is provided an image processing system for processing images of persons or objects to generate an identity preservative feature descriptor learnt for each person or object, the system comprising a processor and memory, the memory storing computer executable instructions that, when implemented by the processor, cause the image processing system to: obtain an image of a person or object; extract at least one spatial attribute of the person or object from the obtained image; extract at least one appearance feature of the person or object from the image by using a mapping function to translate image pixels into appearance attributes represented by at least one numerical feature; and combine the at least one spatial attribute and the at least one appearance feature to generate the unique feature descriptor representing the person or the object, to assign the unique feature descriptor to the image to enable feature descriptors representing the same person or object to be compared to feature descriptors representing different people or objects given a predefined mathematical pseudo-distance metric according to a least a distance from each other.

BRIEF DESCRIPTION OF THE DRAWINGS

Embodiments will now be described with reference to the appended drawings wherein.

DETAILED DESCRIPTION

Turning now to the figures, an exemplary embodiment of the system can use a single observation of a human or object and reidentify it by comparing the observation to a gallery of previously observed humans or objects using a combination of some learnt skeletal and visual appearance characteristics. The image to be re-identified is referred to as the "probe" or "query"; and the "gallery" refers to a database of the images of the already observed or identified objects or persons, or a database of the identity preservative representative features of those images. Certain aspects are directed to a method for person reidentification in a network of security cameras that can be partially overlapping or non-overlapping at all. The system includes an interface for inputting one or more images of the scene and methods for obtaining a set of transformations that map the input visual observations to an embedding space, where observations of the same object/person obtained using the same camera or different cameras at the same time or at different times are close to each other and far from the observations obtained from other objects/persons in a sense that a distance metric, such as Euclidean distance, can be used in the embedding space to measure similarity and dissimilarity between those observations. The drawings disclose illustrative embodiments and may be summarized as follows.

Figure 1:
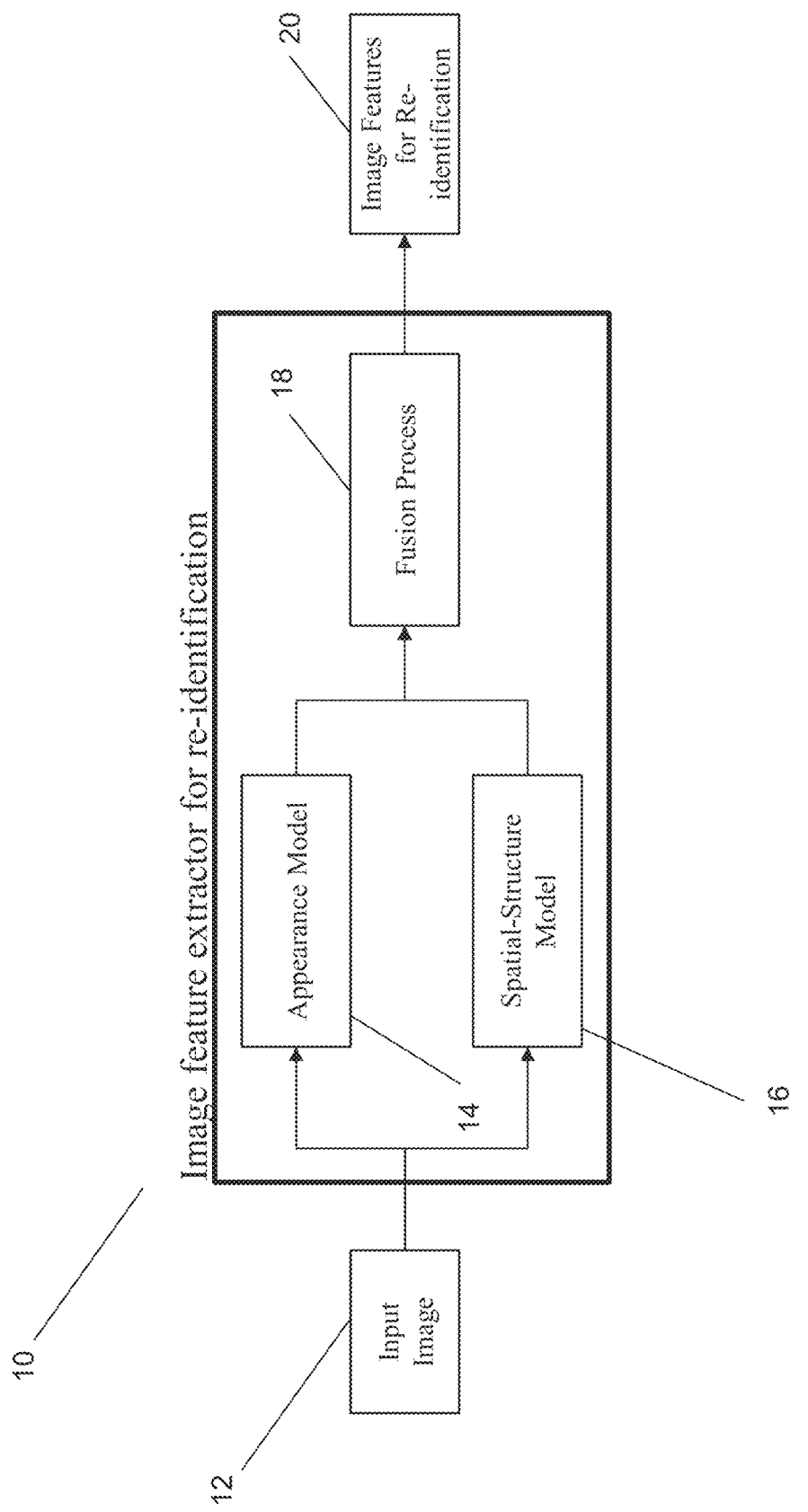
FIG. 1 is a block diagram of a process for feature extraction for object and person reidentification.

FIG. 1 depicts a schematic block diagram of a process for feature extraction for object and person reidentification (10) using a two stream process, containing a visual appearance model (14) and a spatial-structure model (16), referred to as the object/person skeleton or body pose, combined together using a fusion process (18). For an input image (12), a feature vector is extracted (20) which is optimally designed for the re-identification task as described herein.

Figure 2:
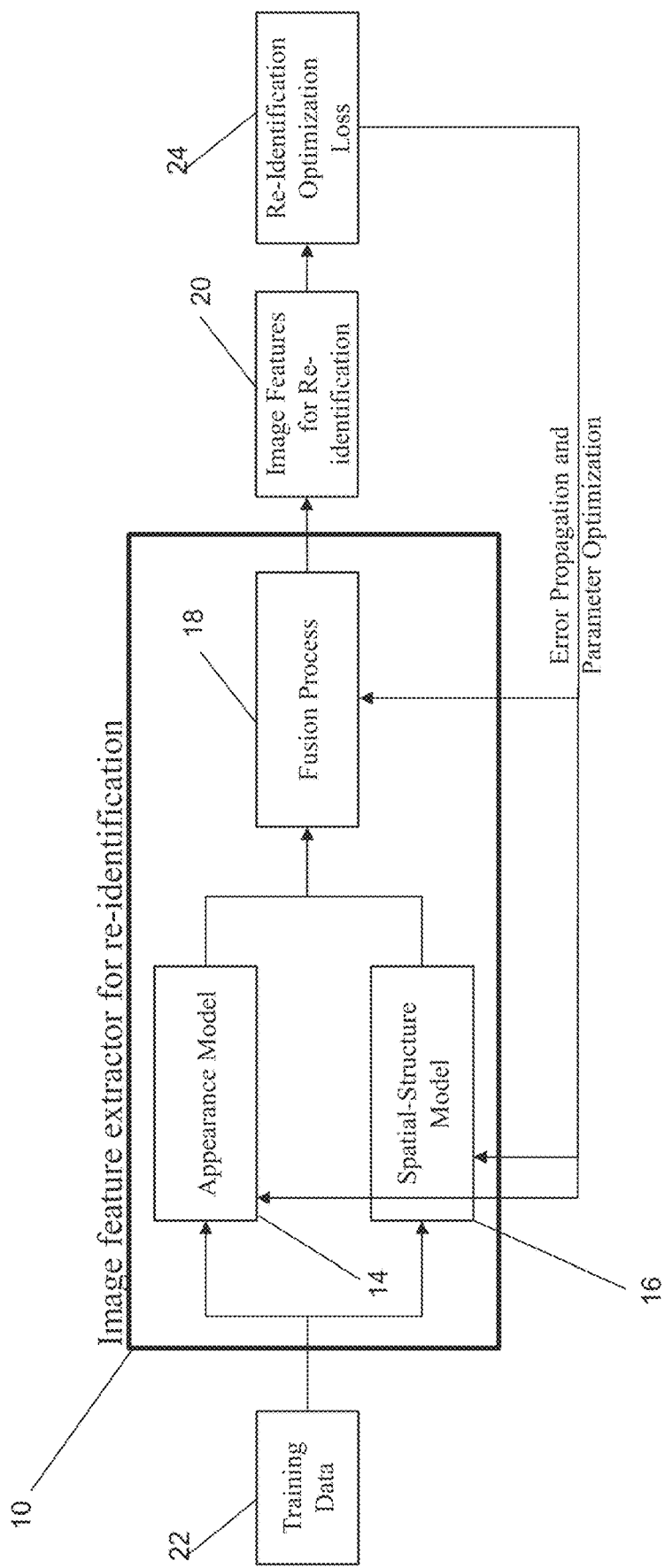
FIG. 2 is a block diagram of a process for learning feature extraction parameters for object and person reidentification.

FIG. 2 depicts a schematic block diagram of a process for learning the feature extraction (10) parameters for object and person reidentification, using an optimization process to optimize the parameters of the appearance model (14), spatial-structure model (16) and the fusion process (18)

based on the calculated re-identification optimization loss or metric learning loss (24) calculated from a set of input data known as training data (22).

Figure 3:
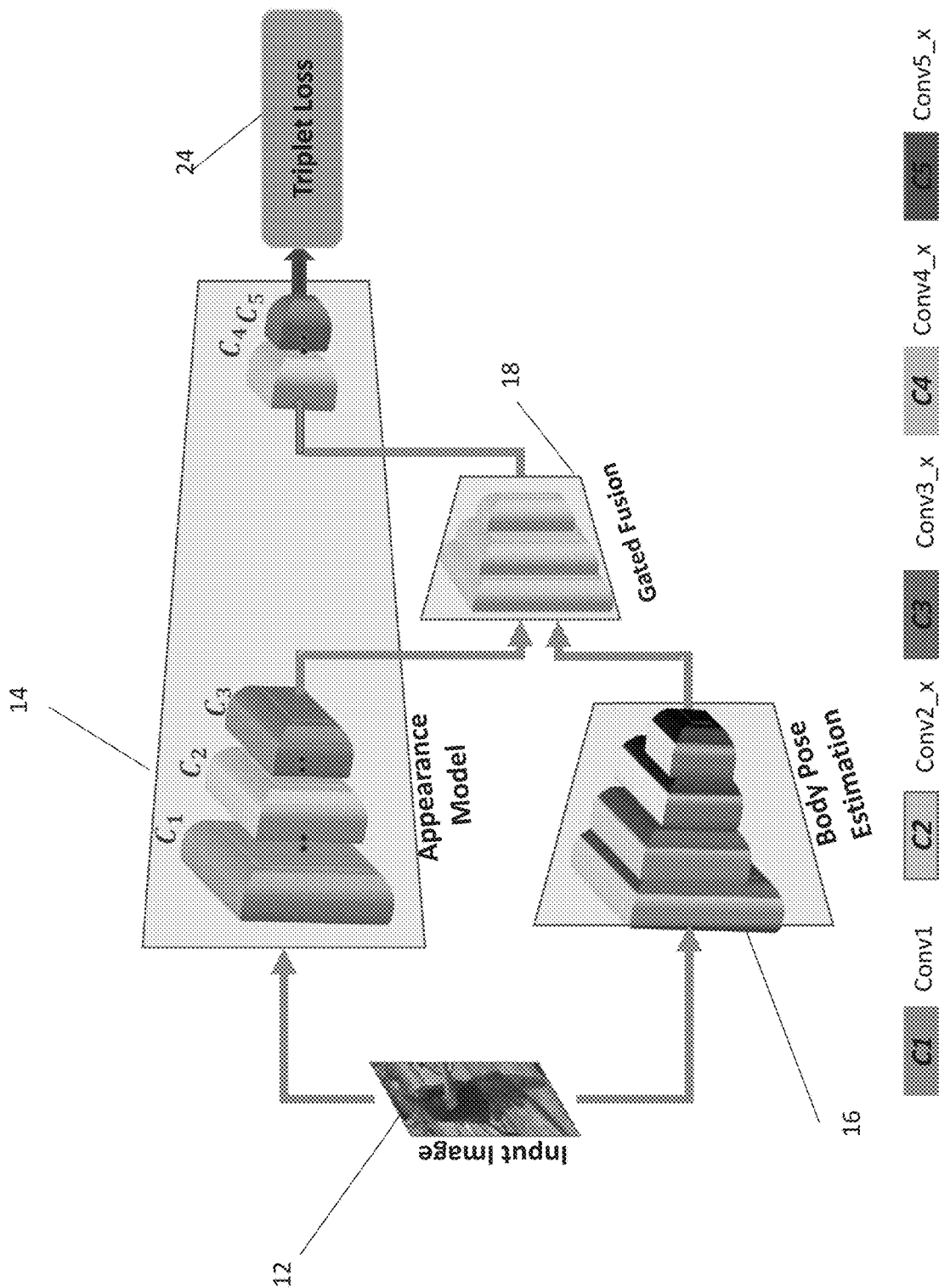
FIG. 3 illustrates an example of using artificial neural networks for appearance models, human pose estimation for a spatial structure model, and a gated fusion for combing multiple feature maps from the artificial neural networks.

FIG. 3 illustrates an example of using artificial neural networks for an appearance model (14), human pose estimation for the spatial structure model (16) and the gated fusion process (18) for combining multiple feature maps from the two artificial neural networks. The reidentification optimization is chosen to be a triplet-loss function (24). The reidentification method can include two parallel streams, an appearance learning stream, an appearance model (14) and pose estimation stream, and a spatial-structure model (16), which serves as a context-based gating mechanism for reidentification. These streams are combined by the gating fusion network to integrate human body pose information into the metric learning process. C1, C2, etc. indicate the feature maps generated after applying convolutional filters for the exemplary neural network architectures.

Figure 4:
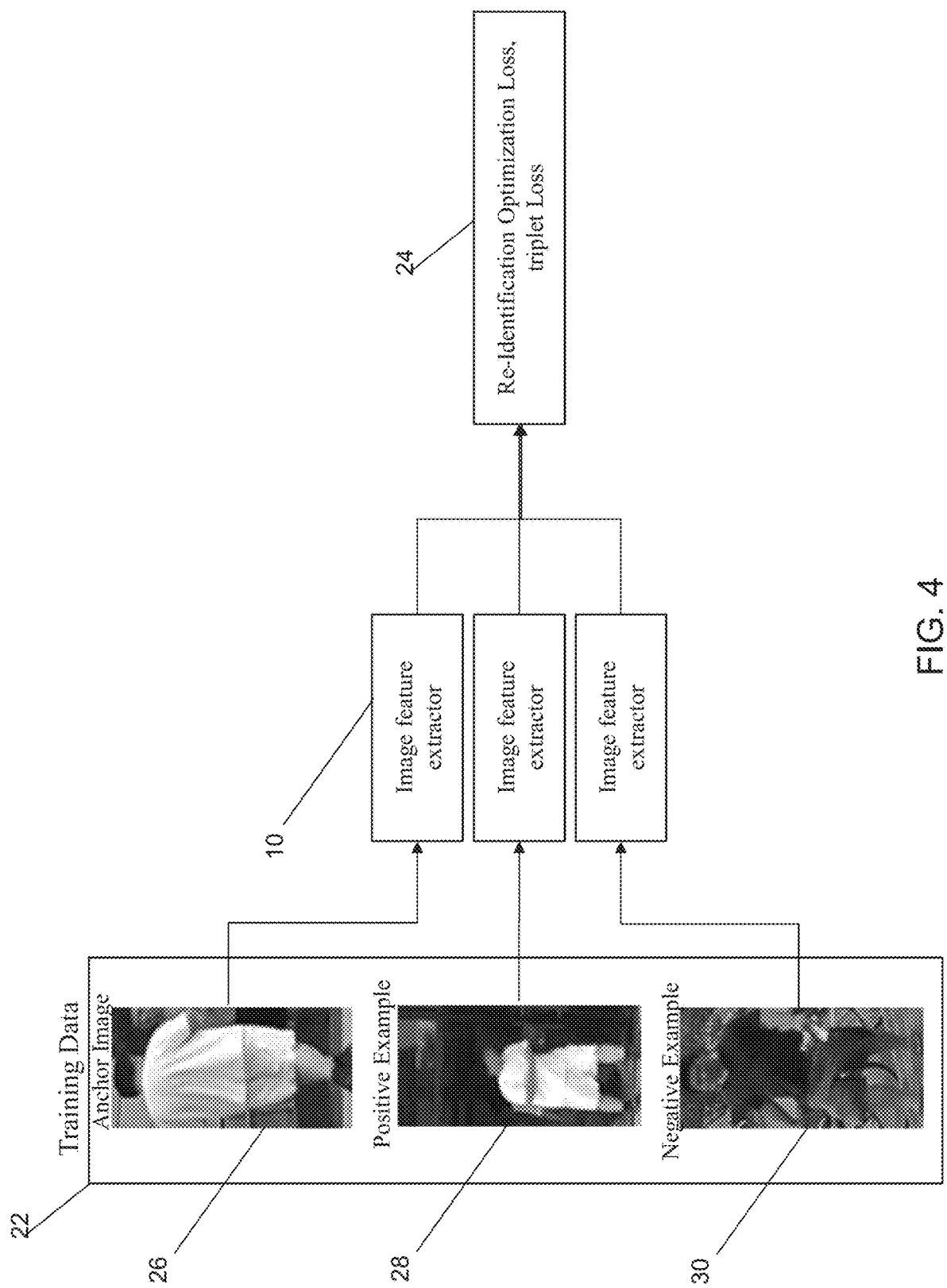
FIG. 4 illustrates an example of metric learning for reidentification with a triplet loss.

FIG. 4 illustrates examples of metric learning for reidentification with the triplet loss. In the training phase for parameter tuning of the image feature extractor (10), the triplet loss (24) is calculated using three images from the training data (22) at each iteration. For every selected sample, the anchor (26); a positive example (28), which corresponds to the same identity as the anchor image; and a negative sample (30), which corresponds to a different identity than the anchor image (26) is selected. The triplet loss can be calculated to minimize the distance, defined using a mathematical distance function, between the anchor and the positive example image feature and at the same time maximize the distance between the anchor and the negative image features. The distance metric can be any pseudo-distance function such as Euclidean distance. The resulting transformation from the images to the feature vectors for reidentification can be referred to as embedding.

Figure 5:
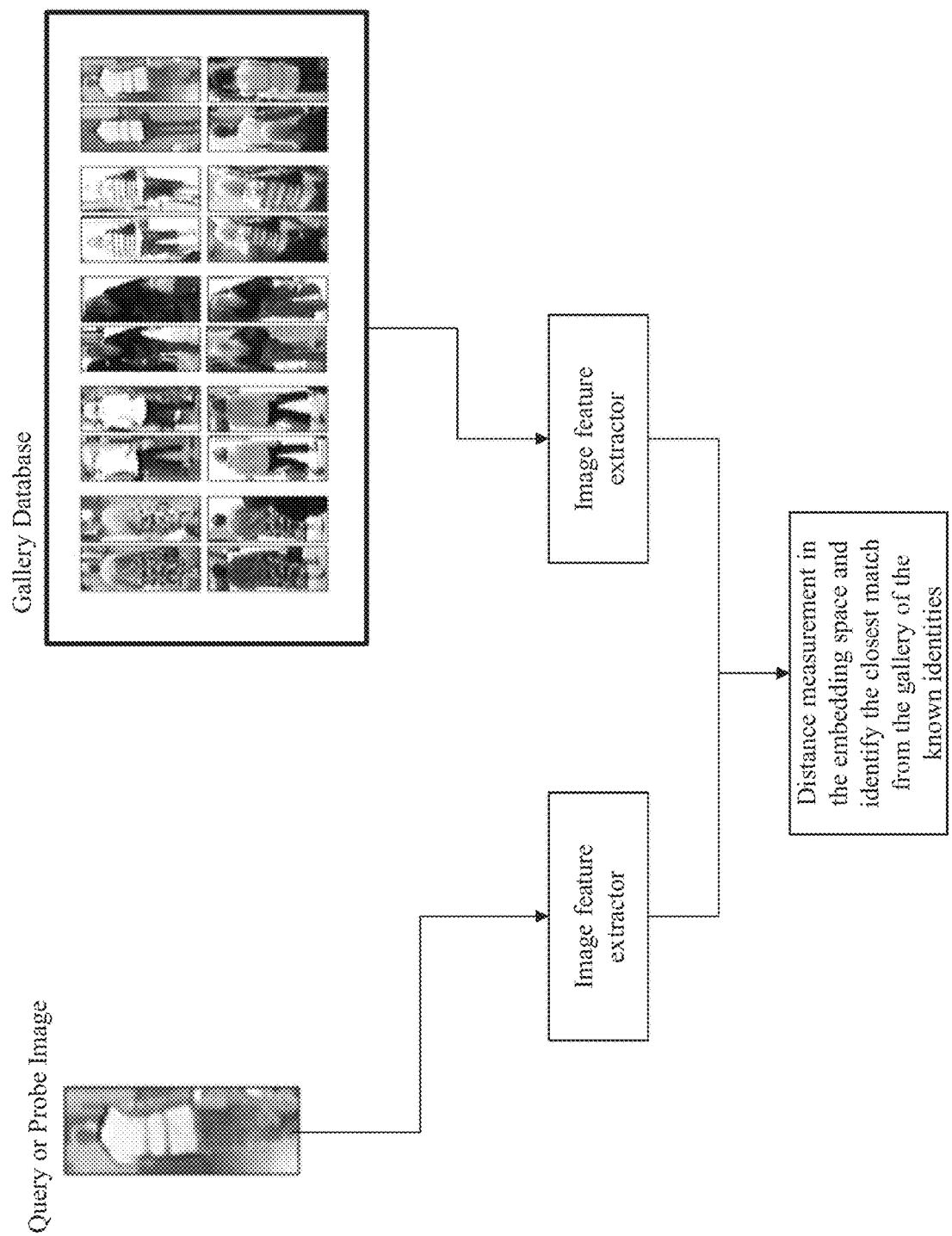
FIG. 5 is a schematic diagram of a reidentification system.

FIG. 5 illustrates a schematic of a generic reidentification system. The system obtains a probe image to identify and, depending on images and their corresponding identities in the gallery database, can calculate the distance (or generate a similarity score) between the probe and the identities in the gallery (or generate a similarity a score).

Figure 6:
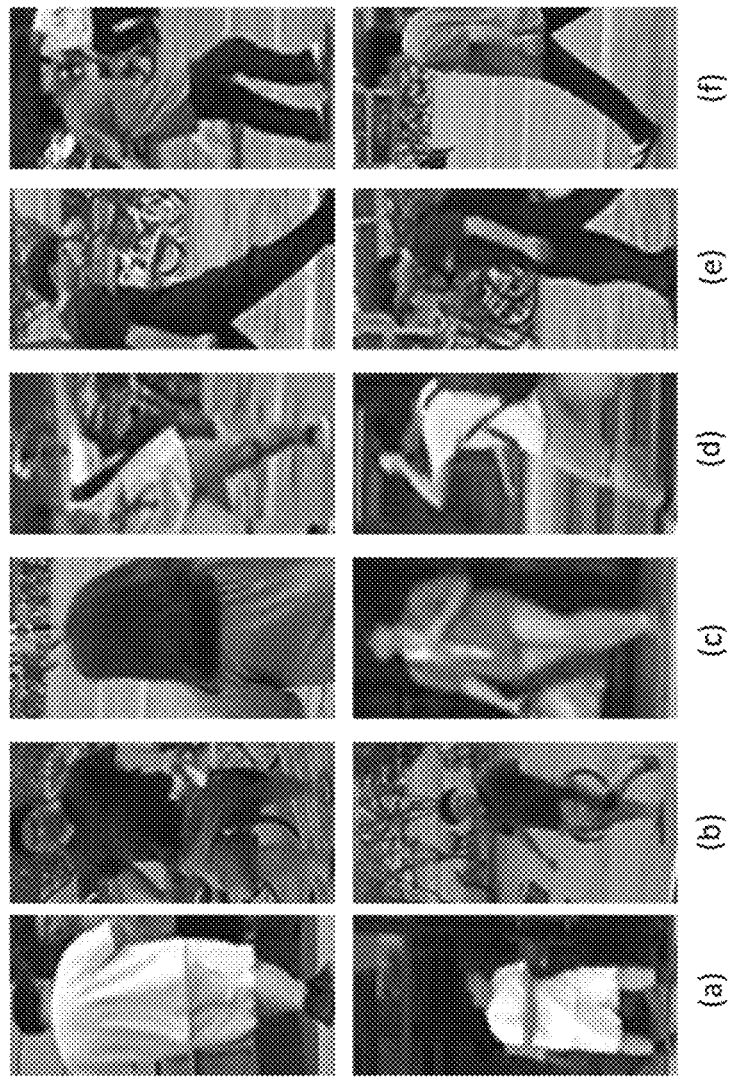
FIG. 6 illustrates examples of misalignment.

FIG. 6 illustrates examples (a) through (f) of misalignment. Misalignment in the input data can be attributed to pose/viewpoint variation and person detection error, which are very common in the surveillance videos.

Figure 7:
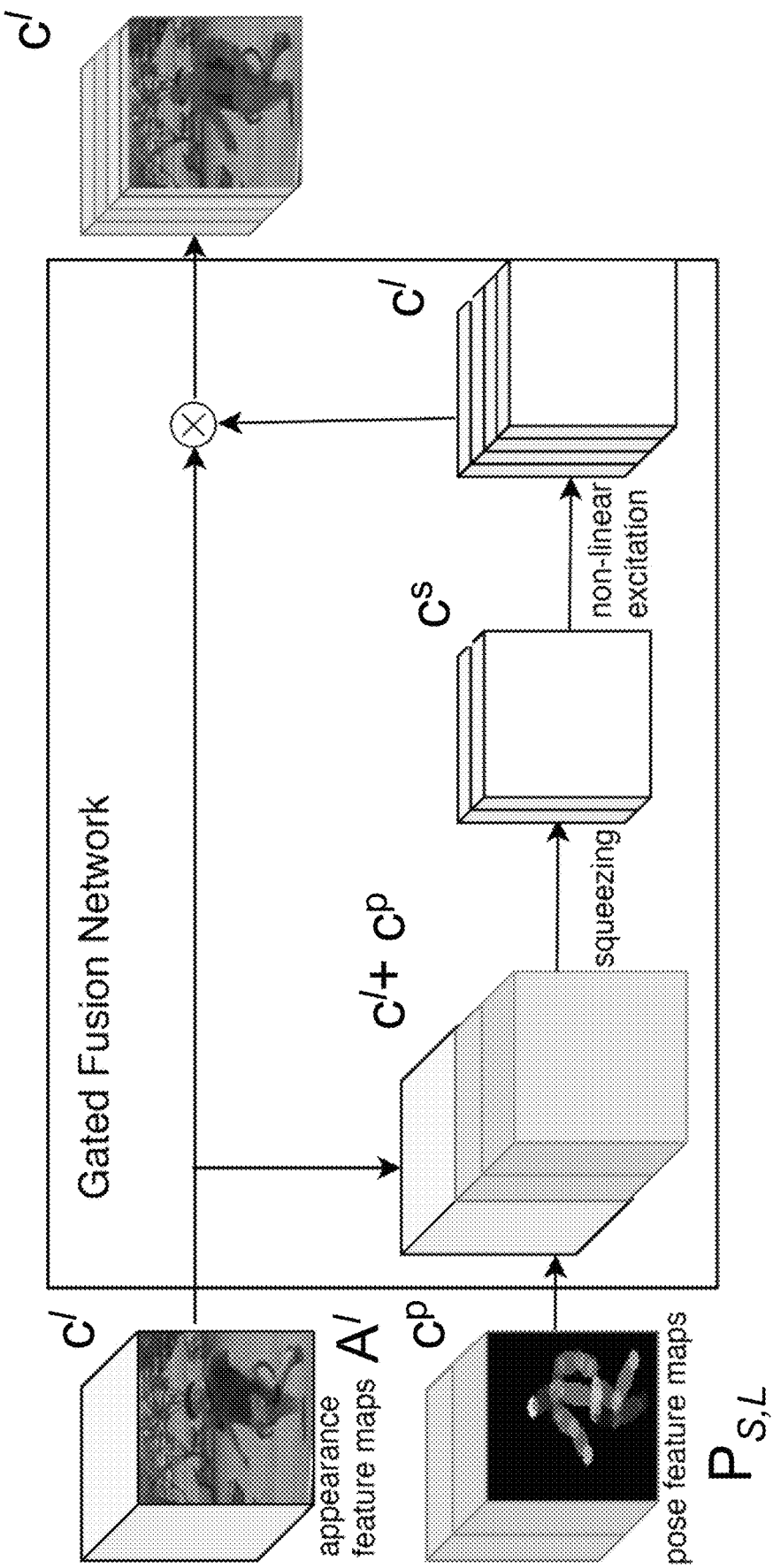
FIG. 7 provides a schematic illustration of a Gated Fusion function.

FIG. 7 provides a schematic illustration of the Gated Fusion function, including squeezing and excitation to fuse the appearance model with the pose model (spatial-structure model).

Figure 8:
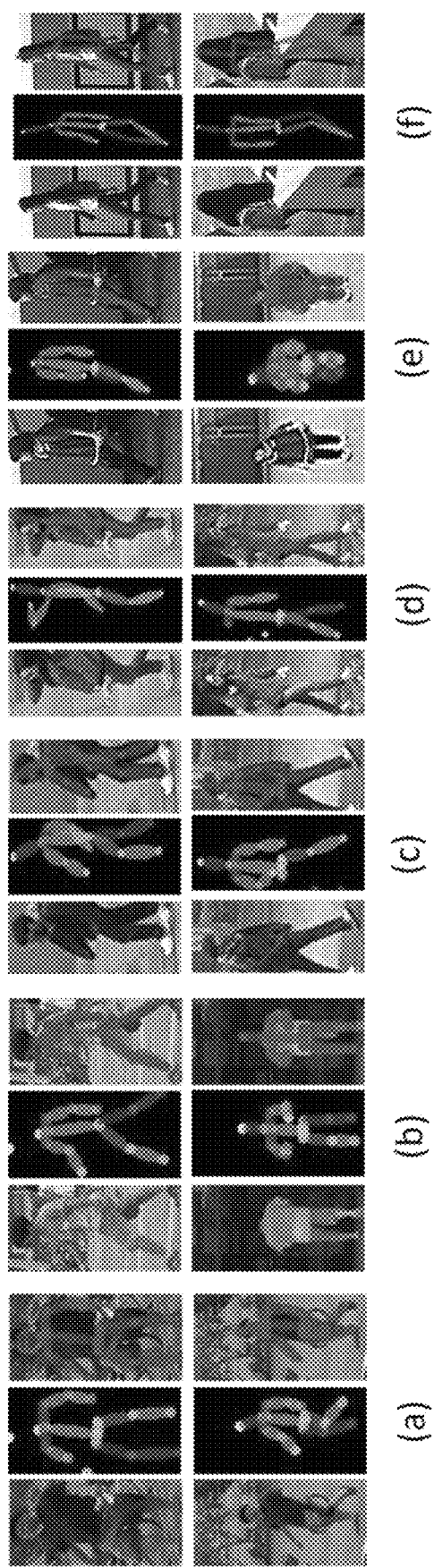
FIG. 8 illustrates pairs of samples from (a,b) Market-1501; (c,d) DukeMTMC-reID and (e,f) CUHK03-NP datasets, respectively.

FIG. 8 illustrates pairs of samples from (a,b) Market-1501; (c,d) DukeMTMC-reID and (e,f) CUHK03-NP datasets, respectively. The first row shows the images of five persons (the input image, its pose map, and the corresponding schematic gated fusion output) captured in one camera view. The second row shows the images from the same five individuals, captured in another camera view.

Figure 9:
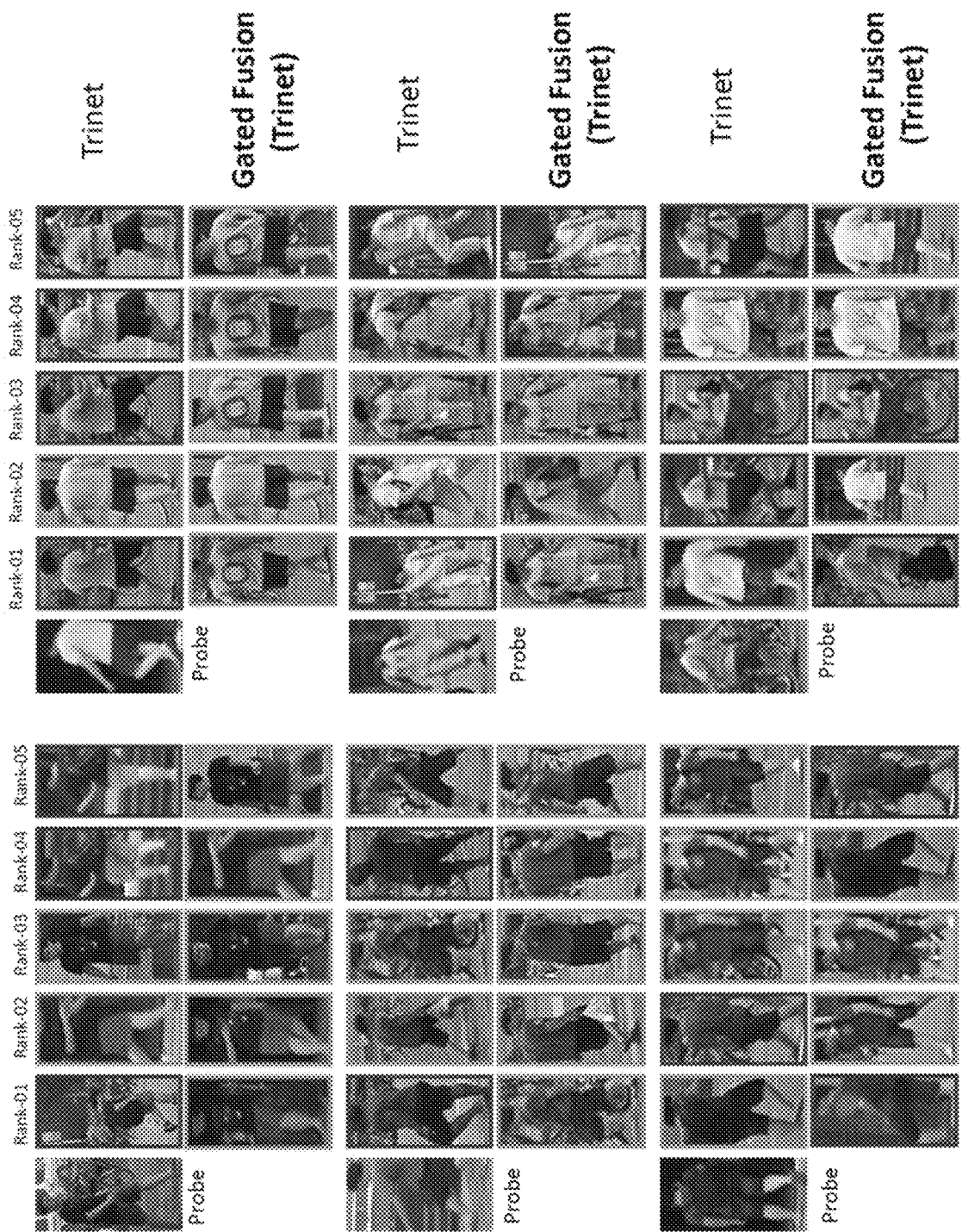
FIG. 9 provides a visual comparison of probe-set images to matching images from a gallery set.

FIG. 9 provides a visual comparison of probe-set images to top 5 matching images from the gallery-set for six random person in the Market-1501 dataset. For each probe, the first and second rows correspond to the ranking results produced by Baseline (Trinet) and Gated Fusion of the appearance and human body pose on the same baseline, respectively. Images surrounded by a green box denotes a match between probe and gallery.

Figure 10:
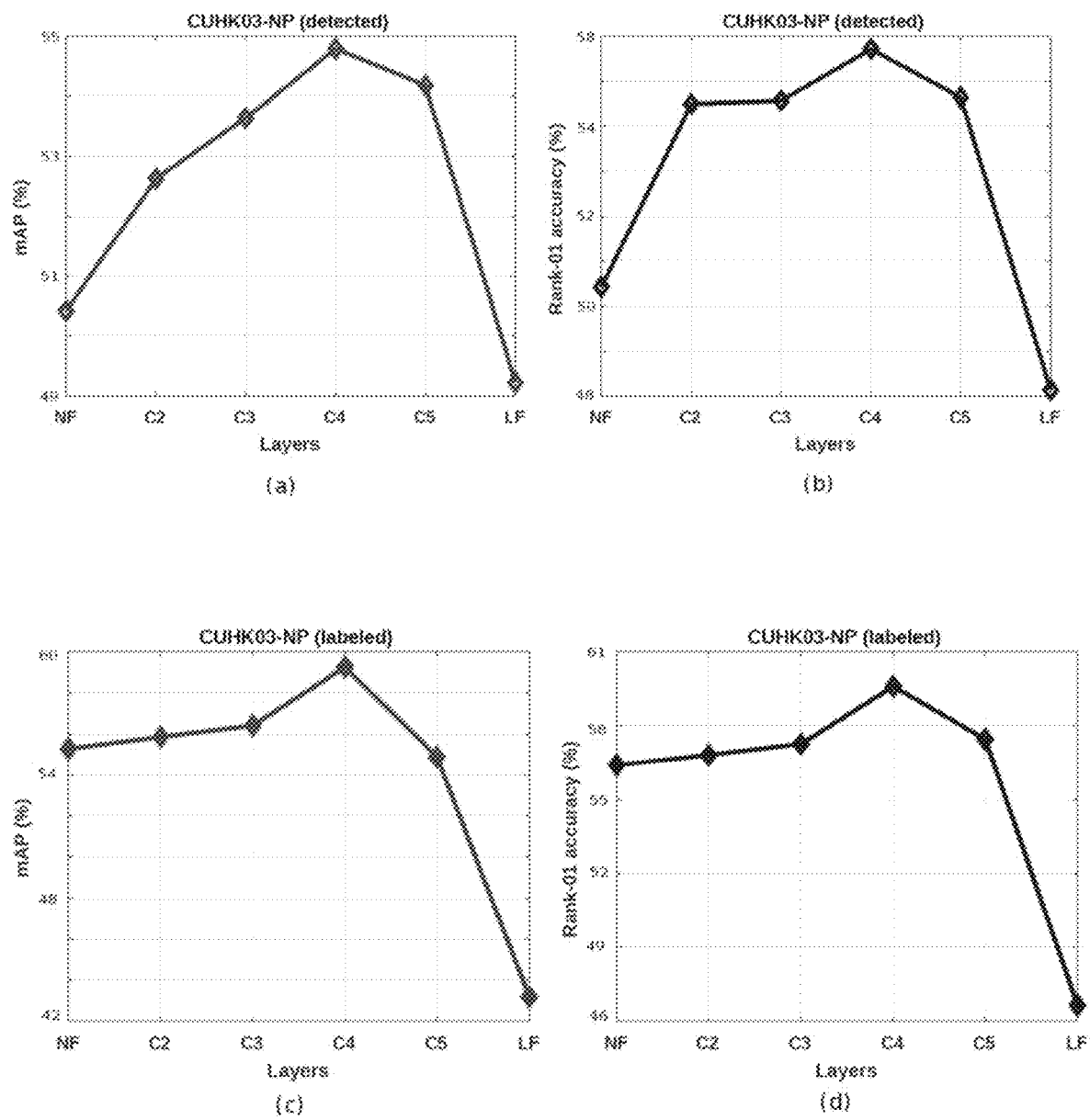
FIG. 10 illustrates the effect of gated fusion at different layers.

FIG. 10 illustrates the effect of gated fusion at different layers of the backbone architectures: (a,b) evaluations for CUHK03-NP (detected) datasets, (c,d) evaluations for CUHK03-NP (labeled) datasets. NF: No Fusion and LF: Late Fusion.

An exemplary embodiment described herein illustrates how the proposed pose-aligned reidentification can be implemented for person reidentification in security and surveillance camera systems. More specifically, the reidentification methodology in the present application takes the input images and transfers them into an embedding space, in which each image is represented by a feature vector, whereas the transformation can include two parallel streams, an appearance learning stream (appearance model) and a spatial structure estimation stream (spatial-structure model), which serves as a context-based gating mechanism for reidentification. These streams can be combined together (e.g., using a gated fusion network) to integrate human body pose information into the metric learning process as shown in FIG. 3.

In this exemplary embodiment, the feature vectors that are representing the appearance attribute and the skeletal structure or spatial attribute of the persons are obtained by passing images through artificial neural networks. However, any method can be used here instead to extract intermediate features representing the images. Therefore, certain aspects of this exemplary embodiment are applicable to the artificial neural networks, but it can be appreciated that the disclosed method should not be limited to the use of artificial neural networks.

Appearance Attributes. The appearance model is a mapping function that takes an input images of a person, transforms the pixel data into numerical features representing appearance attributes that are consistent for the same person, and are capable of distinguishing different persons from each other. Those numerical features are also known as feature maps, which encode low- or high-level image information, similar to any image feature extraction mechanism. Using a Convolutional Neural Network (CNN) as the appearance model, it can be trained using a labelled dataset to extract appearance features for the given input image. Any feature learning process can be used here such as ResNet [10], Inception [11] and DenseNet [12Xhuang2017densely] as the appearance model. One can adopt the triplet loss learning mechanism to extract those features.

Considering the appearance model by itself, $\mathcal{A}$, one can compute the appearance feature map, $A^l$, which is the output of the l-th layer of the appearance model for the input image, I:

$$A^l = \mathcal{A}^l(I)$$

where, $\mathcal{A}^l$ is the appearance feature extractor until l-th layer define as $\mathcal{A}^l: I \to f$, $I \in \mathbb{R}^{h \times w \times 3}$, $f \in \mathbb{R}^{h' \times w' \times c_l}$, with h, and w are the height and width of an input image and h', w', $c_l$ being the height, width and channel number of feature map size of the l-th layer.

Spatial-structure Model or Spatial attribute features. The spatial structure model, in case of person reidentification can be the human skeleton or the human 2D body pose, which captures the structure of the human body parts. The spatial-structure model's role is to provide information about the human body parts and the overall pose to the gating process for regulating the learnt appearance feature in the appearance model. In this embodiment, CNNs can be used to estimate the location of human joints effectively [13]. Rather than taking the exact locations of the estimated body joints coming from the neural network, the human pose confidence maps S and part affinity fields L can be used as a spatial-structure model in this embodiment. The confidence maps represent the confidence distribution of the body joints, while the part affinity fields learn the association between body parts. Therefore, the spatial-structure model $\mathcal{P}$ generates the pose maps $P_{S,L}$ to represent the informative portion of the individual body parts based on the given input images, which could be formulated as:

$$P_{S,L} = \mathcal{P}(I)$$

where P is the pose map extractor define as $\mathcal{P}: I \in \mathbb{R}^{h \times w \times 3}$, $f \in \mathbb{R}^{h' \times w' \times c_p}$, with h, w, being the height and width of an input image and h', w' being the height and width of pose map. Here, $c_p$ represents the total number of confidence maps S of body part locations and vector fields L of part affinities, which encode the degree of affinities among the parts.

Gated Fusion Process. The objective of the gated fusion network is to enable the appearance model to learn informative features by fusing appearance and pose features within local receptive fields at a fused layer. In this way, a gated fusion mechanism such as any variant of squeeze and excitation [14] can be used to adaptively recalibrate the channel-wise feature response to generate informative features. It may be noted that the gated fusion process allows the appearance model to leverage pose information. The gated fusion process can also regulate the appearance model features to pay more attention to the pose-based informative portion, obtained from the Spatial-structure Model. More specifically, the gating process learns a coefficient matrix:

$$G = \mathcal{D}(E(I))$$

where $E \in \{A^l, P_{S,L}\}$ is the concatenated feature map of size h'×w', and each location is described by $c_z = c_l + c_p$. $\mathcal{D}$ is a mapping function defined as $\mathcal{D}: f \to g_l$, $f \in \mathbb{R}^{h' \times w' \times c_z}$, $g_l \in \mathbb{R}^{h' \times w' \times c_l}$.

The gate module in FIG. 7 is designed to learn the spatial-wise and channel-wise attentions guided by a pose-based informative portion. It includes two operations: squeeze and non-linear excitation. The squeeze operation utilizes a 3×3 convolutional layer to aggregate the appearance features and spatial body pose features across their spatial domain, while non-linear excitation operation further captures the channel-wise dependencies between the appearance and pose features internally and externally with a leaky rectified linear unit (LeakyReLU) and a 1×1 convolutional layer. All the feature maps in the gate module have the same h' and w'. The channel number of output attention keeps the same as the appearance features, which allows the output attention to scale and emphasize the appearance feature in pixel-wise levels among all channels.

Once one has a gated output from the gate module, then an effective scheme can be used to align the appearance features. The resultant aligned appearance can be propagating to the rest of the network. For example, one can extract an aligned feature map by applying a Hadamard Product between the appearance feature, $A^l$ and gated output, $g_l$, and the resulting features can then be normalized to attain an aligned feature map for the rest of the layers on the appearance model. A schematic functionality of the gated fusion network is illustrated in FIG. 7. The gated aligned feature $f_g^l$ scheme can be formulated as:

$$f_g^l = A^l \otimes g_l, \quad \tilde{f}_g^l = \frac{f_g^l}{\|f_g^l\|_2}$$

$\tilde{f}_g^l$ is the normalized aligned feature representation and $\otimes$ denotes element-wise product (e.g., Hadamard product).

The parameters of the three components, namely the appearance model, the spatial-structure model or the pose model, and the gated fusion process could be either estimated separately or estimated jointly using standard gradient based learning methods that are commonly used for artificial neural networks. In one scenario, the whole parameter estimation of those components can be estimated using a triplet-loss optimization process. In case of separately learning the parameters of those three models, the neural network training process can be performed in two steps. At first the spatial-structure model can be pre-trained independently on a pose estimation dataset to estimate the pose related feature maps for humans, and then the appearance model and gated fusion trained jointly for the re-identification task while the spatial-structure model remains unchanged. Given an input, the gated fusion network can rely on pose features as an attention mechanism to dynamically select the most discriminant convolutional filters from the appearance model for pair-wise matching.

To experimentally evaluate the results of the disclosed method, tests can be conducted on several different publicly available video datasets for person re-identification: CUHK03-NP [15], Market-1501 [16] and DukeMTMC-reID [17]. Market-1501 [16] is one of the largest public benchmark datasets for person reidentification. It contains 1501 identities which are captured by six different cameras, and 32,668 pedestrian image bounding-boxes obtained using the Deformable Part Models (DPM) pedestrian detector. Each person has 3.6 images on average at each viewpoint. The dataset is split into two parts: 750 identities are utilized for training and the remaining 751 identities are used for testing. One can follow the official testing protocol where 3,368 query images are selected as probe set to find the correct match across 19,732 reference gallery images. CUHK03-NP [15] includes 14,096 images of 1,467 identities. Each person is captured using two cameras on the CUHK campus and has an average of 4.8 images in each camera. The dataset provides both manually labeled bounding boxes and DPM-detected bounding boxes. We follow the new training protocol proposed in [18], similar to partitions of Market1501 dataset. The new protocol splits the dataset into training and testing sets, which include 767 and 700 identities, respectively. In testing mode, one image is randomly selected from each camera as the query for each individual, and the remaining images are used to construct the gallery set. DukeMTMC-reID [17] is constructed from the multi-camera tracking dataset DukeMTMC. It contains 1,812 identities. One can follow the standard splitting protocol proposed in [17] where 702 identities are used as the training set and the remaining 1,110 identities as the testing set. During testing, one query image for each identity in each camera can be used for query and the remaining as the reference gallery set.

Following the prior art metrics for evaluation of reidentification systems, the following metrics can be used for experimental evaluation of this embodiment: the rank-1 accuracy of cumulative matching characteristics (CMC), and the mean average precision (mAP). The CMC represents the expectation of finding a correct match in the top n ranks. When multiple ground truth matches are available, then CMC cannot measure how well the gallery images are ranked. Thus, we also report the mAP scores. Higher values indicate better performance.

Training mode. The appearance and spatial-structure models can be initially pre-trained on ImageNet [19] and COCO [20] datasets. The visualization of the pose estimation results can be seen in FIG. 8. The gated fusion network can be initialized from a Gaussian distribution. During the parameter learning process and fine-tuning with a re-identification dataset, the spatial-structure model is kept intact. The appearance models and gating process are trained using triplet loss where the margin is empirically set to m=0.3. The triplet loss can be replaced by any other objective function for re-identification task, such as contrastive loss or quadruplet loss. The batch size is set to 128, with 4 randomly selected samples for each 32 identities.

The disclosed method can be evaluated for its ability to provide discriminant feature embedding for the input images. Spatial-structure models can extract pose-based feature maps for each image to gate features of the appearance model. Features extracted from query and gallery images can be compared through pair-wise matching. Similarity between each pair of feature embeddings can be measured using, for example, Euclidean distance. For each query image, all gallery images are thereby ranked according to the similarity between their embeddings in Euclidean space, and the label of the most similar gallery image is returned.

Results. Tables 1 to 3 below report the comparative performances of methods on Market-1501, DukeMTMC-reID, CUHK03-NP (detected) and CUHK03-NP (labeled) datasets, respectively. Integrating pose-guided gated fusion on weak baseline (Trinet [8] as the appearance model) shows a considerable improvement over its baseline performance on Market-1501 and DukeMTMC-reID dataset in both measures. Nevertheless, the proposed approach consistently outperforms the considered state-of-the-art methods irrespective of their appearance model or the appearance learning process. Qualitative examples from the Market-1501 dataset which indicates that the spatial-guided re-identification effectively finds the true match in rank-01 when there are cases of misalignment, occlusions and body part missing, while the Baseline approach finds it in later ranks.

TABLE 1

Comparison of rank-1 accuracy and mAP of the proposed approach with weak baseline and state-of-the-art methods on Market-1501 dataset.

| Method | rank-1 (%) | mAP (%) |
| --- | --- | --- |
| Siamese [5] | 65.88 | 39.55 |
| DaRe [21] | 86.4 | 69.3 |
| AWTL [22] | 86.11 | 71.76 |
| Trinet [8] | 84.92 | 68.91 |
| Pose and Appearance Fusion | 88.51 | 74.55 |

TABLE 2

Performance comparison of the proposed method with weak baseline with the state-of-the-art on DukeMTMC-reID dataset. The best/second results are shown in red/blue, respectably.

| Methods | rank-1 (%) | mAP (%) |
| --- | --- | --- |
| DaRe [21] | 75.2 | 57.4 |
| AWTL [22] | 75.31 | 57.28 |
| Trinet [8] | 74.91 | 56.65 |
| Pose and Appearance Fusion | 78.82 | 62.49 |

TABLE 3

Comparison of rank-1 accuracy and mAP of proposed approach with weak baseline and state-of-art methods on the CUHK03-NP (detected) and CUHK03-NP (labeled) dataset. The best/second results are shown in red/blue, respectably.

| Method | detected | | labeled | |
| --- | --- | --- | --- | --- |
| | rank-1 (%) | mAP (%) | rank-1 (%) | mAP (%) |
| DaRe [21] | 55.1 | 51.3 | 58.1 | 53.7 |
| Trinet [8] | 50.43 | 50.2 | 56.93 | 55.64 |
| Pose and appearance Fusion | 57.85 | 54.8 | 61 | 58.99 |

The appearance and pose models can be fused together at different levels, by applying the gating fusion process at lower or higher layers of the feature maps. To match the feature map dimensions a bilinear interpolation can be applied. Depending on the application, the fusion can happen at any layer, however the experimental results suggest that the gated fusion method works well when it fusion is done on the mid-level layers, shown in FIG. 10.

In this particular embodiment, the human body pose is used as the spatial-structure model for pose-aligned person reidentification. An component of this framework is the gated fusion of the spatial-structure and the appearance models as two streams to dynamically select the more relevant representative features for re-identification based on the persons' body pose information, for enhanced feature representation and inference.

This exemplary embodiment discloses the use of one single image as the input for the method, various modifications or extensions to make use of a sequence of images instead of one image will be apparent to those skilled in the art. For example, one can naturally embed temporal consistency in a sequence of images by reusing the optimization state for consecutive images. For those skilled in the art, a multitude of different feature extractors and optimization loss functions can be used instead of the exemplary ones in the current embodiment.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] Brown, Lisa M., Ankur Datta, Rogerio S. Feris, and Sharathchandra U. Pankanti. "Appearance modeling for object re-identification using weighted brightness transfer functions." U.S. Pat. No. 9,633,263, issued Apr. 25, 2017.

[2] M. Farenzena, L. Bazzani, A. Perina, V. Murino, and M. Cristani. Person re-identification by symmetry-driven accumulation of local features. In *CVPR*, 2010.

[3] D. Cheng, Y. Gong, S. Zhou, J. Wang, and N. Zheng. Person re-identification by multi-channel parts-based cnn with improved triplet loss function. In *CVPR*, 2016.

[4] H. Liu, J. Feng, M. Qi, J. Jiang, and S. Yan. End-to-end comparative attention networks for person re-identification. *IEEE Transactions on Image Processing*, 26(7): 3492-3506, 2017.

[5] R. R. Varior, M. Haloi, and G. Wang. Gated siamese convolutional neural network architecture for human re-identification. In *ECCV*, 2016.

[6] M. Koestinger, M. Hirzer, P. Wohlhart, P. M. Roth, and H. Bischof. Large scale metric learning from equivalence constraints. In *CVPR*, 2012.

[7] B. Mirmahboub, H. Kiani, A. Bhuiyan, A. Perina, B. Zhang, A. Del Bue, and V. Murino. Person re-identification using sparse representation with manifold constraints. In *ICIP*, 2016.

[8] A. Hermans, L. Beyer, and B. Leibe. In defense of the triplet loss for person re-identification. arXiv preprint arXiv:1703.07737, 2017.

[9] W. Chen, X. Chen, J. Zhang, and K. Huang. Beyond triplet loss: a deep quadruplet network for person re-identification. In *CVPR*, 2017.

[10] K. He, X. Zhang, S. Ren, and J. Sun. Deep residual learning for image recognition. In *CVPR*, 2016.

[11] C. Szegedy, S. Ioffe, V. Vanhoucke, and A. A. Alemi. Inception-v4, inception-resnet and the impact of residual connections on learning. In *AAAI*, 2017.

[12] G. Huang, Z. Liu, L. Van Der Maaten, and K. Q. Weinberger. Densely connected convolutional networks. In *CVPR*, 2017.

[13] Z. Cao, T. Simon, S.-E. Wei, and Y. Sheikh. Realtime multi-person 2d pose estimation using part affinity fields. In *CVPR*, 2017.

[14] J. Hu, L. Shen, and G. Sun. Squeeze-and-excitation networks. In *CVPR*, pages 7132-7141, 2018.

[15] W. Li, R. Zhao, T. Xiao, and X. Wang. Deepreid: Deep filter pairing neural network for person re-identification. In *CVPR*, 2014.

[16] L. Zheng, L. Shen, L. Tian, S. Wang, J. Wang, and Q. Tian. Scalable person re-identification: A benchmark. In *ICCV*, 2015.

[17] Z. Zheng, L. Zheng, and Y. Yang. Unlabeled samples generated by gan improve the person re-identification baseline in vitro. In *ICCV*, 2017.

[18] Z. Zhong, L. Zheng, D. Cao, and S. Li. Re-ranking person re-identification with k-reciprocal encoding. In *CVPR*, 2017.

[19] O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. *International journal of computer vision*, 115(3):211-252, 2015.

[20] T.-Y. Lin, M. Maire, S. Belongie, J. Hays, P. Perona, D. Ramanan, P. Dollár, and C. L. Zitnick. Microsoft coco: Common objects in context. In *ECCV*, 2014.

[21] Y. Wang, L. Wang, Y. You, X. Zou, V. Chen, S. Li, G. Huang, B. Hariharan, and K. Q. Weinberger. Resource aware person re-identification across multiple resolutions. In *CVPR*, 2018.

[22] E. Ristani and C. Tomasi. Features for multi-target multi-camera tracking and re-identification. In *CVPR*, 2018.

The invention claimed is:

1. A method for processing images of persons or objects to generate an identity preservative feature descriptor learnt for each person or object, the method comprising:
    obtaining an image of a person or object;
    extracting, without reference to another image, at least one spatial attribute of the person or object from the obtained image, wherein the extracted at least one spatial attribute corresponds to spatial characteristics of the person or object within the obtained image;
    extracting at least one appearance feature of the person or object from the obtained image by using a mapping function to translate image pixels into appearance attributes represented by at least one numerical feature; and
    using a fusion mechanism to generate informative features by combining the at least one spatial attribute and the at least one appearance feature, the generated informative features being feature descriptors representing the person or the object, to assign the feature descriptors to the obtained image to enable feature descriptors representing the same person or object to be compared to feature descriptors representing different people or objects in a different image given a predefined mathematical pseudo-distance metric according to a least a distance from each other.

2. The method of claim 1, further comprising using the at least one spatial attribute of the person or object in learning how to extract the at least one appearance feature.

3. The method of claim 2, wherein the learning applies a gated fusion process.

4. The method of claim 2, wherein the learning filters out irrelevant information to focus on the appearance attributes that represent only the person or object of interest.

5. The method of claim 1, wherein the mapping function is learnt using at least one machine learning technique and at least one labelled datapoint.

6. The method of claim 5, wherein the at least one machine learning technique uses a mathematical pseudo-distance function to maximize a similarity between the identity preservative feature descriptors extracted from different observations of the same person or object.

7. The method of claim 5, wherein the at least one machine learning technique uses a mathematical pseudo-distance function to minimize a similarity between the identity preservative feature descriptors extracted from observations of different persons or objects.

8. The method of claim 1, wherein the identity preservative feature descriptors are used for person or object reidentification.

9. The method of claim 1, wherein the identity preservative feature descriptors are used to track persons or objects by associating observations of the same person or object across different images in a video, to generate a trajectory of a target corresponding to the person or object of interest.

10. The method of claim 1, further comprising:
receiving the image or a sequence of images of a person or an object as a query image;
generating the identity preservative feature descriptors for the query image; and
comparing the identity preservative feature descriptors for the query image to a gallery of feature descriptors generated for persons or objects with known identities to identify and/or reidentify the person or object in the query image.

11. The method of claim 1, further comprising calculating a similarity or dissimilarity score using the mathematical pseudo-distance metric between the query image feature descriptors and images in a gallery with known identification.

12. The method of claim 1, wherein human body pose information and/or a body skeleton is use as the spatial attribute used for a person identification or reidentification.

13. A non-transitory computer readable medium comprising computer executable instructions for processing images of persons or objects to generate an identity preservative feature descriptor learnt for each person or object, comprising instructions for performing the method of claim 1.

14. An image processing system for processing images of persons or objects to generate an identity preservative feature descriptor learnt for each person or object, the system comprising a processor and memory, the memory storing computer executable instructions that, when implemented by the processor, cause the image processing system to:
obtain an image of a person or object;
extract, without reference to another image, at least one spatial attribute of the person or object from the obtained image, wherein the extracted at least one spatial attribute corresponds to spatial characteristics of the person or object within the obtained image;
extract at least one appearance feature of the person or object from the obtained image by using a mapping function to translate image pixels into appearance attributes represented by at least one numerical feature; and
use a fusion mechanism to generate informative features by combine the at least one spatial attribute and the at least one appearance feature, the generated informative features being feature descriptors representing the person or the object, to assign the feature descriptors to the obtained image to enable feature descriptors representing the same person or object in a different image to be compared to feature descriptors representing different people or objects given a predefined mathematical pseudo-distance metric according to a least a distance from each other.

15. The system of claim 14, further comprising using the at least one spatial attribute of the person or object in learning how to extract the at least one appearance feature.

16. The system of claim 15, wherein the learning applies a gated fusion process.

17. The system of claim 15, wherein the learning filters out irrelevant information to focus on the appearance attributes that represent only the person or object of interest.

18. The system of claim 14, wherein the mapping function is learnt using at least one machine learning technique and at least one labelled datapoint.

19. The system of claim 18, wherein the at least one machine learning technique uses a mathematical pseudo-distance function to maximize a similarity between the identity preservative feature descriptors extracted from different observations of the same person or object.

20. The system of claim 18, wherein the at least one machine learning technique uses a mathematical pseudo-distance function to minimize a similarity between the identity preservative feature descriptors extracted from observations of different persons or objects.

21. The system of claim 14, wherein the identity preservative feature descriptors are used for person or object reidentification.

22. The system of claim 14, wherein the identity preservative feature descriptors are used to track persons or objects by associating observations of the same person or object across different images in a video, to generate a trajectory of a target corresponding to the person or object of interest.

23. The system of claim 14, further comprising:
receiving the image or a sequence of images of a person or an object as a query image;
generating the identity preservative feature descriptors for the query image; and
comparing the identity preservative feature descriptors for the query image to a gallery of feature descriptors generated for persons or objects with known identities to identify and/or reidentify the person or object in the query image.

24. The system of claim 14, further comprising calculating a similarity or dissimilarity score using the mathematical pseudo-distance metric between the query image feature descriptors and images in a gallery with known identification.

25. The system of claim 14, wherein human body pose information and/or a body skeleton is use as the spatial attribute used for a person identification or reidentification.

* * * * *